US012766532B2

(12) United States Patent
Ritter et al.

(10) Patent No.: US 12,766,532 B2
(45) Date of Patent: Oct. 20, 2026

(54) METHOD FOR CONTROLLING A FAN ON A SPRAY DEVICE, AND SPRAY DEVICE

(71) Applicant: J.Wagner GmbH, Markdorf (DE)

(72) Inventors: Tino Ritter, Bermatingen (DE); Lukas Neuhaus, Markdorf (DE)

(73) Assignee: J. Wagner GmbH, Markdorf (DE)

( * ) Notice: Subject to any disclaimer, the term of this patent is extended or adjusted under 35 U.S.C. 154(b) by 182 days.

(21) Appl. No.: 18/710,319

(22) PCT Filed: Nov. 28, 2022

(86) PCT No.: PCT/EP2022/083525
§ 371 (c)(1),
(2) Date: May 15, 2024

(87) PCT Pub. No.: WO2023/094665
PCT Pub. Date: Jun. 1, 2023

(65) Prior Publication Data

US 2025/0010316 A1 Jan. 9, 2025

(30) Foreign Application Priority Data

Nov. 28, 2021 (DE) ......................... 102021131184.5

(51) Int. Cl.
*B05B 7/12* (2006.01)
*B05B 7/00* (2006.01)

(52) U.S. Cl.
CPC .............. *B05B 7/12* (2013.01); *B05B 7/0081* (2013.01)

(58) Field of Classification Search
CPC ................................ B05B 7/12; B05B 7/0081
(Continued)

(56) References Cited

U.S. PATENT DOCUMENTS 2,791,664 A * 5/1957 Rohacs .................... H01H 3/20
200/332.2
2,916,576 A * 12/1959 Croskey ................. H01H 35/40
200/82 C (Continued)

FOREIGN PATENT DOCUMENTS

CN 207013187 U 2/2018
DE 3722537 1/1989

(Continued)

OTHER PUBLICATIONS

International Preliminary Report on Patentability for International Application No. PCT/EP2022/083525, dated Jun. 6, 2024, 18 Pages.

(Continued)

*Primary Examiner* — Chee-Chong Lee
(74) *Attorney, Agent, or Firm* — Christopher J. Volkmann; KELLY, HOLT & CHRISTENSON PLLC

(57) ABSTRACT

A method is provided for controlling a fan on a high volume low pressure (HVLP) paint-spray device. The HVLP paint-spray device includes a trigger, for triggering a spraying procedure, a paint feed, the fan with a fan motor, and control electronics for the fan. The control electronics include a power control for the fan motor, and with the HVLP paint-spray device switched on in an interrupted spraying procedure the fan motor is actively energized at least temporarily at a reduced power in comparison with the spraying procedure The method includes activating, by at least one switch or button, the control electronics for operation of the motor, and controlling, by at least the trigger, emission of paint.

16 Claims, 1 Drawing Sheet

(58) Field of Classification Search
USPC .............................................................. 239/8
See application file for complete search history.

(56) References Cited

U.S. PATENT DOCUMENTS

| | | | | | | |
|---|---|---|---|---|---|---|
| 3,147,767 | A | * | 9/1964 | Gross | B60S 3/044 | 134/17 |
| 3,246,845 | A | * | 4/1966 | Techler | B60S 3/044 | 239/126 |
| 3,433,415 | A | * | 3/1969 | Enssle | B05B 9/0413 | 239/126 |
| 3,438,583 | A | * | 4/1969 | Lawrence | B08B 3/028 | 134/123 |
| 3,501,899 | A | * | 3/1970 | Allen | G05D 7/0635 | 55/467 |
| 3,827,827 | A | * | 8/1974 | Hill | F04B 49/08 | 417/310 |
| 3,860,363 | A | * | 1/1975 | Silvern | F04B 49/225 | 417/295 |
| 3,876,336 | A | * | 4/1975 | Nash | E03B 5/00 | 417/38 |
| 4,035,107 | A | * | 7/1977 | Kesten | F04B 43/02 | 417/310 |
| 4,047,665 | A | * | 9/1977 | Moynihan | B08B 3/026 | 417/301 |
| 4,238,073 | A | * | 12/1980 | Liska | B05B 9/0403 | 417/34 |
| 4,244,527 | A | * | 1/1981 | De Fusco | B05B 5/053 | 200/81.9 R |
| 5,074,467 | A | * | 12/1991 | Geberth | B05B 7/24 | 200/82 C |
| 2006/0127227 | A1 | * | 6/2006 | Mehlhorn | F04D 15/0236 | 417/53 |
| 2006/0286917 | A1 | | 12/2006 | Dionne | | |
| 2007/0275615 | A1 | * | 11/2007 | Norton | F04B 49/022 | 441/90 |
| 2011/0040192 | A1 | | 2/2011 | Brenner et al. | | |
| 2011/0255992 | A1 | * | 10/2011 | Tran | F04B 49/065 | 417/1 |
| 2014/0271230 | A1 | | 9/2014 | Darroch | | |

FOREIGN PATENT DOCUMENTS

| | | | |
|---|---|---|---|
| EP | 0572237 | B1 | 3/1996 |
| EP | 1602411 | B1 | 8/2008 |
| EP | 3207997 | | 5/2019 |
| EP | 3556780 | | 10/2019 |
| EP | 3566780 | A1 | 11/2019 |

OTHER PUBLICATIONS

International Search Report and Written Opinion for PCT Application No. PCT/EP2022/083525, dated Feb. 17, 2023, 13 pages including English Translation.
German Examination Report for Application No. 102021131184,5, dated Jul. 7, 2022, 6 pages.

* cited by examiner

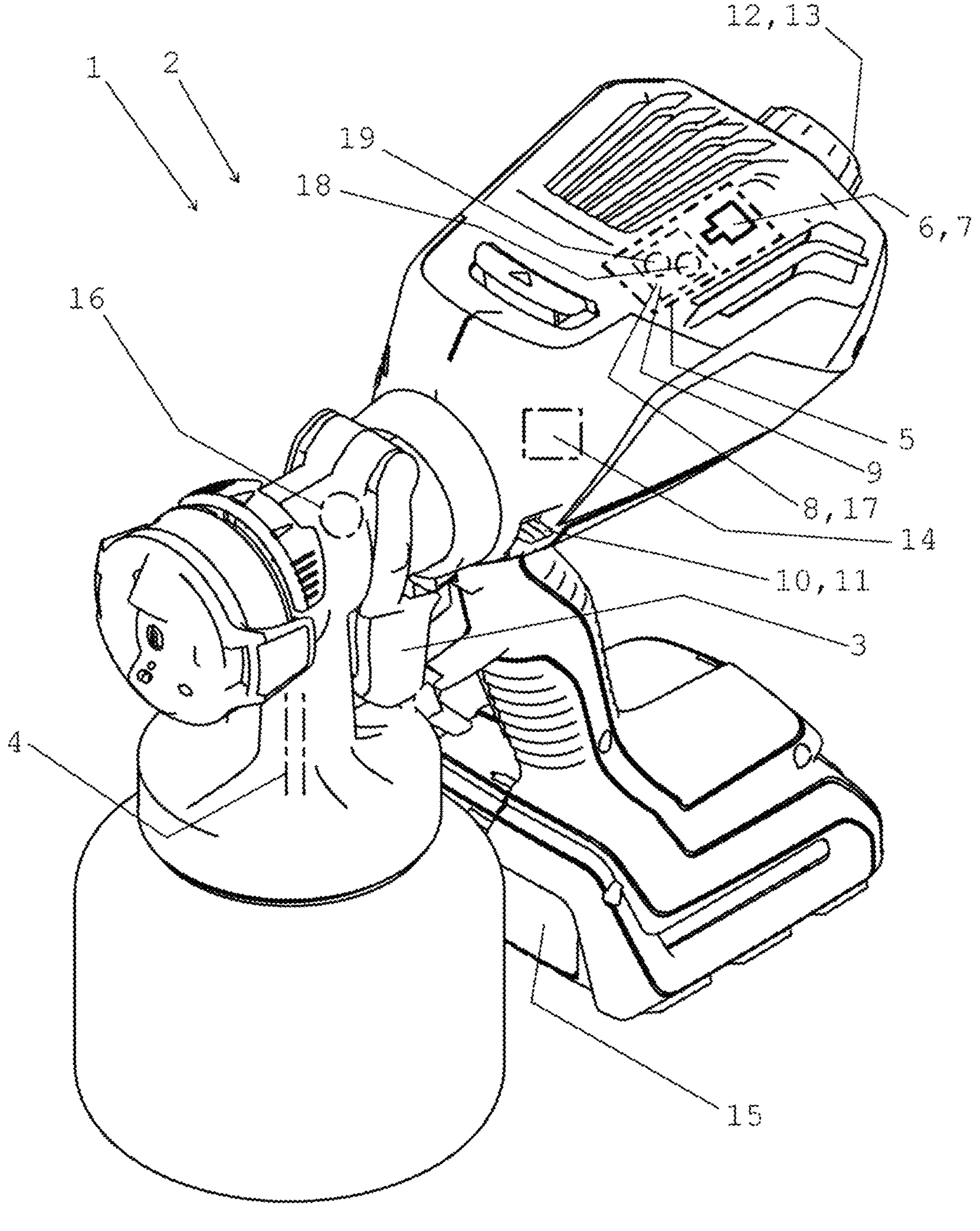
12,13
1
2
19
18
6,7
16
5
9
8,17
14
10,11
3
4
15

METHOD FOR CONTROLLING A FAN ON A SPRAY DEVICE, AND SPRAY DEVICE

CROSS-REFERENCES TO RELATED APPLICATION

This Application is a Section 371 National Stage Application of International Application No. PCT/EP2022/083525, filed Nov. 28, 2022, and published as WO 2023/094665 A1 on Jun. 1, 2023, and claims priority to German Application No. 102021131184.5, filed Nov. 28, 2021; the contents of these applications are hereby incorporated by reference in their entirety.

BRIEF DESCRIPTION OF THE DRAWINGS

FIG. 1 shows a spray device 1, in one example.

DETAILED DESCRIPTION

For the purpose of atomizing the paint, many spray devices utilize a fan, in particular the HVLP method, in which a high volume of atomizer air flows past a paint nozzle at low pressure and thereby atomizes paint that has been made available. The atomizer air is made available by a fan or by some other source of air having a high delivery volume. The HVLP method and the pressure and volume parameters thereof are widely known and are in use (see, for example, https://de.wikipedia.org/wiki/High_Volume_Low_Pressure). Corresponding devices are also known from EP 1 602 411 B1, for example.

From EP 3 566 780 A1 a method is known for controlling a sprayer, which provides the following steps:

- making power available to a motor of an air-supply unit on the basis of a signal that is output by a sensor, wherein the air-supply unit outputs a high volumetric flow of compressed air, wherein the compressed air flows within a hose and through two valves, wherein the two valves are arranged respectively upstream and downstream of the hose, wherein the signal indicates a parameter of the compressed air that is located between the two valves;
- reducing the power to the motor on the basis of the signal that indicates an increase in the level of the parameter;
- increasing the power to the motor on the basis of the signal that indicates a decrease in the level of the parameter;
- and spraying liquid from a spray gun using a volume of the compressed air while a first valve of the two valves is open and the second valve of the two valves is closed, the volume of the compressed air having previously been trapped in the hose between the two valves while the two valves were closed and while a trigger of the spray gun was not actuated, the volume of the compressed air being released by reason of the actuation of the trigger which opens the first valve of the two valves,
- wherein the gun receives the compressed air from the hose, and each of the provisioning, reducing and increasing steps is carried out by a control circuit.

A high-volume low-pressure (HVLP) turbine assembly is known from US 2014/271230 A1. This assembly includes a housing with a turbine which includes a turbine fan which is capable of being rotated within a turbine housing. A microcontroller is arranged within the housing, the microcontroller controlling a speed of an electric motor that sustains the turbine fan. A pressure sensor and an airflow sensing means are in airflow communication with a turbine-air outlet. The HVLP turbine assembly has no bleeder port in airflow communication with the turbine-air outlet. Rather, the microcontroller has been configured to reduce the speed of the electric motor to an idling speed after a predetermined period of time has elapsed, the predetermined period of time being started when the airflow sensing device indicates a period of inactivity.

An exhaust-cleaning plant for a spray booth with at least one ventilator motor is known from US 2006/286917 A1. The exhaust control system includes a spraying-activity detector and a speed-control circuit for an electric motor. The speed-control loop is connected to the fan motor and connected to the detector, in order to set the speed of the motor variably as a function of at least the spraying activity. Furthermore, a method is known for controlling an exhaust system of a spray booth with at least one fan motor. This method includes the steps of detecting a spraying activity and, after the detecting of the spraying activity, of increasing an air volume exhaust rate of the exhaust system.

An extraction apparatus for paint-injection chambers is known from DE 37 22 537 A1, with at least one extraction fan driven by an electric motor and with a holding device for suspending a spray gun or such like, which is coupled with a switching apparatus, capable of being actuated by it, reducing the quantity of extraction air, the holding device being coupled with an electrical switch which is connected to the at least one electric motor via a power-reducing circuit.

Ordinarily, by the actuation of a trigger on the paint gun a valve arrangement—in particular, a needle valve—is moved which enables the discharge of the paint from a paint reservoir via a paint line to the paint outlet at the tip of the valve, and therefore initiates a paint-spraying procedure.

In order to achieve the continuous and uniform delivery of paint, the paint reservoir and/or the paint-delivery system is/are subjected to a slight pressure, this being achievable, for example, by means of a bypass of the air path of the atomizer air into the paint reservoir.

Between the spraying procedures—that is to say, for example, when the spray device has been set aside for masking work, etc.—the fan is switched off, in order to save energy and to shut off the airflow. Particularly in the case of battery-operated devices-such as those known from CN 207 013 187 U, for example—the disconnection of the motor is also an advantage for the service life of the battery.

Moreover, if the spraying procedure is briefly interrupted in the course of working, the paint reservoir is often kept under the applied pressure described above.

If the user actuates the trigger of the spray device dynamically—in particular, jerkily—in the course of utilization, it may happen that the spray device makes paint available at the paint outlet even before the requisite working pressure or the requisite working volume of atomizer air has been made available by the fan. Particularly in the case where the fan has been switched off, both the inertia of the fan itself and the delay of the control electronics for the fan provide for a time offset from the start of the spraying procedure until the provision of the working pressure at the fan. This has the consequence that poorly or barely atomized paint is emitted, and the spray device "spits". This state is undesirable and is intended to be avoided by virtue of one or more examples described in the following.

An object of the present disclosure is to propose a method for controlling a fan on a spray device, as well as a spray device, that has been improved in its operational reliability, and to bring particularly cost-efficient components into operation for this purpose.

One example relates to a method for controlling a fan on a spray device, in particular on an HVLP paint-spray device, wherein the spray device includes a switching apparatus, in particular a trigger, for triggering a spraying procedure, a paint feed, a fan with a fan motor, and also control electronics for the fan, wherein the control electronics include a power control for the fan motor, and with the spray device switched on in the case of an interrupted spraying procedure the fan motor is actively energized at least temporarily at a reduced power in comparison with the spraying procedure. One example is characterized in that at least one switch or button or such like is capable of being utilized for the purpose of activating the control electronics for the operation of the motor, and at least the trigger or such like is capable of being utilized for the purpose of controlling the emission of paint.

Simply reducing the fan power avoids, in comparison with a stoppage of the fan motor, on the one hand inertial effects when starting up, or energizing, the motor, on the other hand also a control problem, since the motor is already running in the regulated state, and only adjustments of speed or power have to be undertaken. Particularly in the case of BLDC motors, the initialization of the motor control system, and the associated delay, can be dispensed with. In this way, in the event of interruptions, particularly in the event of brief interruptions of the spraying procedure, an irrelevant time offset between a start of the spraying procedure and the attaining of the requisite fan power is achieved, or a time offset is even avoided entirely.

In addition to the associated saving of energy and operational improvement, by virtue of the running fan there is, moreover, an acoustic feedback for the user, who can immediately recognize the readiness for operation, or readiness for spraying, since the fan is running in a base-load mode-on standby, so to speak.

In a development of the method there is provision that a reduction time-window, in particular a latency period, has been provided that has to elapse after the interrupting of the spraying procedure before a reduction of the power of the fan motor occurs. In the event of an interruption of the spraying procedure, the fan power has immediately been set to working pressure of the spraying procedure. In order to avoid superfluous adjustments, a reduction time-window has been provided which avoids a change in power at the fan motor in the case of minimal interruptions—for example, when the trigger is released in the course of changing direction within a spraying procedure. Only after the reduction time-window has elapsed do the control electronics become active and regulate the power of the fan motor to a reduced power, a kind of base load.

In an exemplary embodiment, the reduction time-window is between 10 ms and 2 s, in particular between 50 ms and 1 s, particularly preferably between 50 ms and 500 ms. Consequently the reduced power becomes active only after the reduction time-window in question has elapsed.

In a further development of the method there is provision that the power of the fan is reduced only to the extent that a working pressure for the spray device is capable of being set by increasing the fan power by means of the control electronics within an intensification time-window, in particular within an acceleration-time, the intensification time-window between reduced power and working power being between 10 ms and 1 s, in particular between 50 ms and 500 ms, particularly preferably between 10 ms and 500 ms.

The reduced fan power, which in a kind of base load is also set at least temporarily in the case of an interrupted spraying procedure, should be chosen in this embodiment in such a way that the time until the necessary fan power for the spraying procedure is attained is sufficiently short in order to avoid the effects described in the introduction—for example, the spitting of paint. The control task of the control electronics has to be such that the power is reduced only to the extent that a restarting of the fan to a working pressure for the spraying procedure occurs sufficiently quickly, in particular within the stated intensification time-window.

One variant for executing the method provides that the switch, or button, and the trigger are capable of being actuated mechanically decoupled from one another.

The control electronics for the fan, particularly when use is being made of a BLDC motor, can advantageously be activated via a switch expressly provided therefor. The initialization and activation of the fan then take place, it being possible for this activation of the fan to take place either automatically or by means of a further switch, and outside the spraying procedure the fan runs at a reduced speed and consequently at reduced power. In this way, a trigger—for example, for operating a needle valve for outputting paint from a paint duct—can be decoupled from the activation and the control of the fan, and may come into operation only for the purpose of controlling the increase in power, or may have been coupled with the control electronics.

A further embodiment provides, moreover, that a standby-time until the fan motor is switched off into a state of rest has been provided, and/or that an idling-time at reduced fan power until the fan motor is switched off into a state of rest has been provided.

In order, particularly in the case of a battery-operated device, to prevent the fan from continuing to run permanently at reduced fan power in the event of an interruption of work for an above-average time, which is at least temporarily equivalent to a stoppage of work, the fan is switched off.

In particular, in one embodiment of the method there is provision that the switching of the spray device into an operating state brings about an energizing of the fan motor at reduced power, in particular an idling mode at reduced power, preferably at a base load.

In this way, a spray device can be kept in a state of operational readiness without additional control elements-such as motor controls, for example—having to be switched on prior to the spraying procedure. The acoustic feedback concerning the operational readiness, described in the introduction, is therefore also established immediately or can be acknowledged as a reminder signal that the device has to be switched off again after utilization.

By reason of the lower consumption of energy obtaining at reduced fan power, the method is preferentially suitable for devices in which a power supply has been provided via a battery, in particular an interchangeable battery. Since for the purpose of avoiding the undesirable effects of the spitting of paint in the event of an interrupted spraying procedure, battery-operated devices should dispense with a disconnection of the fan but, in particular, should readily employ BLDC motors by reason of their lightweight design and high energy efficiency, the method is especially suitable in all embodiments for the provision of the desired interference resistance and quality assurance in spray guns.

There may also be provision to switch, after the activation of the control electronics for the fan motor, the stationary fan motor to be ready for operation by means of an at least two-stage switch assigned to the trigger, in such a manner:

that in the event of a slight actuation of the trigger the fan motor is activated, is accelerated to an idling speed below a working speed, or to a working speed, and a paint valve is kept closed, there being provision, in particular, that the idling speed is such that only a maximally desired paint pressure is built up ahead of the paint valve, and that in the event of a stronger actuation of the trigger, by means of which the paint valve is also opened, the fan motor is accelerated to a working speed above the idling speed or is kept at the working speed already attained, there being provision, in particular, that the working speed is such that the spray device is operated in the designated spraying mode.

By this means, the spray device can be conveniently controlled solely by means of the trigger.

Furthermore, there may be provision to activate the control electronics for the fan motor by means of the switch or the button or such like, and/or to specify a speed provided for the working speed to the control electronics by means of a manually operable setting device, this speed either being set by means of the setting device to be continuously variable or being set to have multiple stages, the setting device taking the form, in particular, of a rotary switch. By this means, the spray device can be adapted to an extremely wide range of requirements as regards its fan power.

There may also be provision to provide that after an actuation of the trigger the activation of the fan motor is maintained only for a period of time determined by a disconnecting device, unless the trigger or the setting device is actuated again. By this means, an energy-saving function adapted to the usage behavior can be easily realized.

Furthermore, there may be provision to equip the disconnecting device with a timer and with at least one event sensor, in which case there is provision to interrupt a running-time of the timer by virtue of at least one event detected by the at least one event sensor, so that the fan motor is switched off prior to expiration of the running-time. By this means, the energy-saving behavior can be further optimized if the event sensor takes the form of a position sensor, for example, and the recognition of a spatial position of the spray device that is not suitable for the spraying mode results in an interruption of the timer, and therefore in a disconnection.

There may also be provision to operate the fan motor as a sensorless BLDC fan motor. Such fan motors have a technically simple structure and can be controlled effectively with regard to their speed.

Finally, there may also be provision to operate the spray device in a manner depending on whether a selector switch is in a first position or in a second position, the spray device being operated in accordance with claim 11, or claims 11 and 12, when the selector switch is in the first position. By this means, different operating modes can be easily realized.

One example also relates to a spray device, in particular an HVLP paint-spray device, wherein the spray device includes a trigger for triggering a spraying procedure, a paint feed, a fan with a fan motor which takes the form, in particular, of a sensorless BLDC motor, and also control electronics for the fan, wherein the control electronics include a power control for the fan motor and wherein the control electronics have been programmed in such a manner that with the spray device switched on in the case of a spraying procedure interrupted by a deactivation of the trigger the fan motor continues to be actively energized by the power electronics, wherein the further active energizing occurs in such a manner that the power output of the power control is reduced in stepwise manner or continuously to a minimum power or to a zero power over a period of at least 30 seconds until a renewed activation of the trigger.

By this means, interruptions of the spraying mode are prevented from resulting in a loss of quality in the result of spraying.

Further particulars of the present disclosure are shown in the drawing on the basis of a spray device 1 which is represented schematically.

FIG. 1 shows the spray device 1, which takes the form of an HVLP spray device 2, in perspective view. With reference to FIG. 1, in the following various practical variants of the spray device are described schematically, and various variants of the method for controlling a fan 5 on the spray device 1 are described.

In each practical variant, the spray device 1 includes a trigger 3, for triggering a spraying procedure, a paint feed 4, the fan 5 with a fan motor 6—which takes the form, in particular, of a sensorless BLDC motor 7—and also control electronics 8 for the fan 5. The control electronics 8 include a power control 9 for the fan motor 6, and the control electronics 8 have been programmed in such a manner that with the spray device 1 switched on in the case of a spraying procedure interrupted by a deactivation-namely a non-actuation of the trigger 3—the fan motor 6 continues to be actively energized by the power electronics 9. In this connection, the spray device 1 is switched on and off by means of a switch 10 which has the function of a main switch 11. In accordance with a practical variant which is not represented, the switch 10 may also have been realized as a button which then also has the function of a main switch. After a deactivation of the trigger 3, the further active energizing of the control electronics 8 occurs in such a manner that the power output of the power control 9 is reduced in stepwise manner or continuously to a minimal power or to a zero power over a period of at least 30 seconds until a renewed activation of the trigger 3. By this means, both the consumption of energy is reduced and it is ensured that, after a brief interruption of a spraying mode, work can continue in the spraying mode without noticeable delay and without loss of quality.

The power control 9 for the fan motor 6 works as a speed control which keeps the fan motor at a predetermined motor speed, such as, for example, at the idling speed or at the working speed.

Optionally, the spray device 1 further includes a manually operable setting device 12 which takes the form of a rotary switch 13. By means of the setting device 12, it is possible to bring influence to bear on the control electronics 8 in such a manner that a desired working speed of the fan motor 6 has been preset by the respective rotary position of the setting device 12. According to one practical variant which is not represented, the setting device may alternatively also have been formed by a first button and a second button. In this case, the first button performs the function of a plus-button, and the second button performs the function of a minus-button, so that switching forward and backward between a series of predefined settings can be effected.

In principle, a certain fan power is predefined by a certain motor speed. In this connection, the fan power is lower at idling speed than at working speed.

Optionally, the spray device 1 further includes, in addition to or as an alternative to the setting device 12, a selector switch 14 which has a first switching position and a second switching position. In the first switching position of the selector switch 14, the spray device 1 then works in such a manner that the speed of the fan motor 6 is determined exclusively by the position of the trigger 3 and, for example, no after-running has been provided for after the trigger 3 has been released. In the second switching position of the selector switch 14, the spray device 1 then works in such a manner that the speed of the fan motor 6 is only partially determined by the position of the trigger 6, and is also determined by other factors.

For example, in a first switching position of the selector switch 14 a normal mode is provided by the selector switch 14, and in a second switching position of the selector switch 14 an Eco mode is provided.

In this connection, according to a first variant the normal mode has been configured in such a way that the fan 5 runs permanently at working speed in accordance with a chosen power-level, and the trigger 3 only has influence on a paint valve, and in this connection the Eco mode has been configured in such a way that the fan 5 runs at the idling speed with the trigger 3 unactuated, and accelerates to the working speed, which corresponds to the chosen power-level, only with the trigger actuated.

In this connection, according to a second variant the normal mode has been configured in such a way that the fan 5 runs at the idling speed with the trigger 3 unactuated, and accelerates to the working speed, which corresponds to the chosen power-level, only with the trigger actuated, and the Eco mode has been configured in such a way that the fan 5 has been switched off with the trigger 3 unactuated, and accelerates to the working speed, which corresponds to the chosen power-level, only with the trigger actuated.

In the method according to one example for controlling the fan 5 on the spray device 1 there is provision that the control electronics 8 include the power control 9 for the fan motor 6, and with the spray device 1 switched on in the case of an interrupted spraying procedure the fan motor 6 is actively energized at least temporarily at a reduced power in comparison with the spraying procedure, and there is provision that the switch 10, which works as main switch 11, is utilized for the purpose of activating the control electronics 8 for the operation of the motor, and also at least the trigger 3 is utilized for the purpose of controlling an emission of paint.

In accordance with the method, a reduction time-window, in particular a latency period, may also be provided, by virtue of which time has to elapse after the interrupting of the spraying procedure before the power of the fan motor 6 is reduced.

In this connection, the time defined by the reduction time-window amounts to between 10 ms and 2 s, in particular between 50 ms and 1 s, particularly preferably between 50 ms and 500 ms.

Furthermore, the method may provide for reducing the power of the fan 5 only to such an extent that a working pressure for the spray device 1 is capable of being set by increasing the fan power by means of the control electronics 8 within an intensification time-window, in particular within an acceleration-time, the intensification time-window between reduced power, such as obtains in the idling mode, and working power being between 10 ms and 1 s, in particular between 50 ms and 500 ms, particularly preferably between 10 ms and 500 ms.

The switch 10, which takes the form of the main switch, and the trigger 3 have been separated from one another in such a manner that they can be operated independently of one another.

The method may also provide a standby-time until the fan motor 6 is switched off into a state of rest, and/or may provide an idling-time at reduced fan power until the fan motor 6 is switched off into a state of rest.

Furthermore, by virtue of the switching of the spray device 1 into an operating state the method may provide for bringing about an energizing of the fan motor 6 at reduced power, in particular an idling mode at reduced power, preferably at a base load.

The spray device 1 is supplied with energy by means of a battery 15 which takes the form, in particular, of an interchangeable battery.

In one practical variant, the method provides that the stationary fan motor 5 is ready for operation after the activation of the control electronics 8 for the fan motor 5, which is undertaken by means of the switch 10, in such a manner:

- that in the event of a slight actuation of the trigger 3 the fan motor 5 is activated, is accelerated to an idling speed below a working speed, or to a working speed, and the paint valve 16 is kept closed, there being provision, in particular, that the idling speed is such that only a maximally desired paint pressure is built up ahead of the paint valve 16, and
- that in the event of a stronger actuation of the trigger 3, by which the paint valve 16 is also opened, the fan motor 5 is accelerated to a working speed above the idling speed or is kept at the working speed already attained, there being provision, in particular, that the working speed is such that the spray device 1 is operated in the designated spraying mode.

For the method, there may also be provision to activate the control electronics 8 for the fan motor 5 by means of the switch 10 or the aforementioned button or such like, and/or to specify a speed provided for the working speed to the control electronics 8 by means of the manually operable setting device 12, this speed either being set by means of the setting device 12 to be continuously variable or being set to have multiple stages, the setting device 12 taking the form—as already mentioned above—of a rotary switch.

An alternative or cumulative variant of the method also provides for maintaining the activation of the fan motor only for a period of time determined by a disconnecting device 17 after an actuation of the trigger 3, unless the trigger 3 or the setting device 12 is actuated again. In this connection, the disconnecting device 17 may have been at least partially integrated into the control electronics 8.

In addition to the two method sequences described above, there may be provision to equip the disconnecting device 17 with a timer 18 and with an event sensor 19, in which case a running-time of the timer 18 is interrupted by virtue of at least one event detected by the at least one event sensor 19, so that the fan motor 6 is switched off prior to expiration of the running-time. The event sensor 19 may take the form of a vibration-sensor, by means of which a fall of the spray device, for instance, is detected.

According to one practical variant of the method, there is provision to operate the spray device 1 in a manner depending on whether the selector switch 14 is in the first position or is in the second position, the spray device 1 being operated in such a way when the selector 14 is in the first position that it switches off automatically where appropriate and a user has to actuate the trigger 3 slightly in order to activate the spray device, so that a control is afforded by means of the trigger, and the spray device 1 being operated in such a manner when the selector switch 14 in the second position that a speed of the fan motor 6 does not fall below an idling speed even with the trigger 3 unactuated.

According to one practical variant which is not represented, there may also be provision to realize the described functionality of the selector switch also as a further switching stage of the main switch, so that with the main switch a choice can also be made, for example, between a normal mode and an Eco mode.

According to another practical variant which is not represented, there is provision to design the main switch as a ring switch which includes a rotary ring as actuating member. In this case, the rotary ring has been designed and positioned in such a manner that in an OFF position of the main switch the trigger is blocked, that in a first ON position of the main switch the trigger is released, and that in a second ON position of the main switch the trigger is blocked but the fan motor is energized at idling speed or working speed. By virtue of this second ON position, the spray device can be employed, for example, for the purpose of blowing off masking sheets, in which case a spraying mode has been reliably avoided by virtue of the blocking of the trigger.

Although the present invention has been described with reference to preferred embodiments, workers skilled in the art will recognize that changes may be made in form and detail without departing from the spirit and scope of the invention.

LIST OF REFERENCE SYMBOLS

1 spray device
2 HVLP spray device
3 trigger
4 paint feed
5 fan
6 fan motor
7 BLDC motor
8 control electronics
9 power control
10 switch
11 main switch
12 manually operable setting device
13 rotary switch
14 selector switch
15 battery
16 paint valve
17 disconnecting device
18 timer
19 event sensor

The invention claimed is:

1. A method for controlling a fan on a high volume low pressure (HVLP) paint-spray device, wherein the HVLP paint-spray device includes a trigger for triggering a spraying procedure, a paint feed, the fan with a fan motor, and control electronics for the fan, wherein the control electronics include a power control for the fan motor, and wherein, when the HVLP paint-spray device is on during an interrupted spraying procedure, the fan motor is actively energized, at least temporarily, at a reduced power that is less than a working power of the fan motor during the spraying procedure, wherein the method comprises:

activating, by at least one switch or button, the control electronics for operation of the fan motor, detecting, after activating the control electronics for operation of the fan motor, activation of an at least two-stage switch assigned to the trigger, wherein:

in an event of an activation of the trigger, by which a paint valve is kept closed, the fan motor is accelerated to an idling speed that is less than a working speed or is accelerated to the working speed, wherein the idling speed is such that only a maximally desired paint pressure is built up ahead of the paint valve, and in an event of a stronger actuation of the trigger that is greater than the activation of the trigger, by which the paint valve is opened, the fan motor is accelerated from the idling speed to the working speed or is kept at the working speed already attained, wherein the working speed is such that the HVLP paint-spray device is operated in a designated spraying mode, and controlling, by at least the trigger, emission of paint.

2. The method as claimed in claim 1, and further comprising:

providing a reduction time-window comprising a latency period that has to elapse after an interruption of the spraying procedure before a reduction of a power of the fan motor occurs.

3. The method as claimed in claim 2, wherein the reduction time-window is between 10 milliseconds (ms) and 2 seconds(s).

4. The method as claimed in claim 3, wherein the reduction time-window is between 50 ms and 1 s.

5. The method as claimed in claim 3, wherein the reduction time-window is between 50 ms and 500 ms.

6. The method as claimed in claim 1, and further comprising:

reducing a power of the fan; and setting a working pressure for the HVLP paint-spray device by increasing the power of the fan with the control electronics within an intensification time-window comprising an acceleration-time from the reduced power of the fan to the working power of the fan, wherein the intensification time-window is between 50 milliseconds (ms) and 500 milliseconds (ms).

7. The method as claimed in claim 1, wherein the at least one switch or button are mechanically decoupled from the trigger, and wherein the at least one switch or button are actuated separately from the trigger.

8. The method as claimed in claim 1, and further comprising:

providing at least one of:

a standby-time until the fan motor is switched to a state of rest, or an idling-time at the reduced power of the fan motor until the fan motor is switched to a state of rest.

9. The method as claimed in claim 1, and further comprising:

switching the HVLP paint-spray device into an operating state; and energizing, in response to switching to the HVLP paint-spray device into the operating state, the fan motor to an idling mode at the reduced power.

10. The method as claimed in claim 1, wherein an energy supply is provided via an interchangeable battery.

11. The method as claimed in claim 1, wherein the control electronics for the fan motor are activated by the at least one switch or button, wherein a speed for the working speed of the fan motor is specified to the control electronics by a manually operable setting device, the speed being set by the manually operable setting device to be continuously variable or to have multiple stages, and wherein the manually operable setting device includes a rotary switch.

12. The method as claimed in claim 11, wherein, after an actuation of the trigger, an activation of the fan motor is maintained for a period of time determined by a disconnecting device, unless the trigger or the manually operable setting device is actuated again.

13. The method as claimed in claim 12, wherein the disconnecting device includes a timer and at least one event sensor, and wherein a running-time of the timer is interrupted by at least one event detected by the at least one event sensor, so that the fan motor is switched off prior to expiration of the running-time.

14. The method as claimed in claim 12, wherein the HVLP paint-spray device is operated in a manner depending on whether a selector switch is in a first position or is in a second position.

15. The method as claimed in claim 1, wherein the fan motor is operated as a sensorless brushless DC (BLDC) fan motor.

16. The method as claimed in claim 1, wherein the fan and the fan motor are carried on the HVLP paint-spray device.

* * * * *